United States Patent
Monestier et al.

(10) Patent No.: US 10,883,707 B2
(45) Date of Patent: Jan. 5, 2021

(54) LIGHTING DEVICE COMPRISING INTERSECTING WIRES

(71) Applicant: LUMILEDS HOLDING B.V., Schiphol (NL)

(72) Inventors: Florent Monestier, Kerkrade (NL); Christian Kleijnen, Ell (NL)

(73) Assignee: Lumileds LLC, San Jose, CA (US)

(*) Notice: Subject to any disclaimer, the term of this patent is extended or adjusted under 35 U.S.C. 154(b) by 0 days.

(21) Appl. No.: 16/662,935

(22) Filed: Oct. 24, 2019

(65) Prior Publication Data
US 2020/0132287 A1 Apr. 30, 2020

(30) Foreign Application Priority Data
Oct. 24, 2018 (EP) ..................... 18202223

(51) Int. Cl.
*F21V 23/00* (2015.01)
*B60Q 3/80* (2017.01)
*F21S 43/14* (2018.01)
*F21S 41/141* (2018.01)
*B60Q 1/00* (2006.01)

(52) U.S. Cl.
CPC .......... *F21V 23/002* (2013.01); *B60Q 1/0088* (2013.01); *B60Q 3/80* (2017.02); *F21S 41/141* (2018.01); *F21S 43/14* (2018.01)

(58) Field of Classification Search
None
See application file for complete search history.

(56) References Cited

U.S. PATENT DOCUMENTS

| 7,105,858 | B2 | 9/2006 | Popovich |
| 9,970,637 | B2 | 5/2018 | Verheyen |
| 10,256,389 | B1* | 4/2019 | Zykin .................... H01L 33/62 |
| 2005/0057939 | A1* | 3/2005 | Mizuyoshi .......... H01L 25/0753 362/505 |

FOREIGN PATENT DOCUMENTS

| EP | 1524704 | 4/2005 |
| JP | 57-095682 | 6/1982 |
| KR | 10-2010-0109176 A | 10/2010 |
| KR | 20120124660 | 11/2012 |
| WO | 2012/064148 | 5/2012 |

OTHER PUBLICATIONS

Written Opinion of the International Search Authority PCT/EP2019/077928 (Year: 2020).*

* cited by examiner

*Primary Examiner* — Britt D Hanley
(74) *Attorney, Agent, or Firm* — Volpe Koenig

(57) ABSTRACT

Lighting devices and methods of manufacture are described. A lighting device includes first wires and second wires. Each of the first wires has a first longitudinal axis and a bent section. Each of the second wires has a second longitudinal axis and a bent section. The first wires and the second wires intersect one another within intersection regions. The first longitudinal axis and the second longitudinal axis are in the same plane. The bent section of each of the first wires is arranged in one of the intersection regions. The bent section of each of the second wires is arranged between two intersection regions. A predefined minimum distance is provided between the first wires and the second wires in the intersection regions. The lighting device further includes light-emitting elements electrically coupled to the first wires and the second wires at the intersection regions.

20 Claims, 4 Drawing Sheets

LIGHTING DEVICE COMPRISING INTERSECTING WIRES

FIELD OF INVENTION

The present disclosure relates to lighting devices based on light-emitting elements arranged on wires, in particular in the field of automotive lighting.

BACKGROUND

Automotive lighting may be used to improve or enhance communication between a vehicle and its environment, for example pedestrians or other road users. Developments have been made to provide more comprehensive information to the environment by using communication lights, in particular for automated and autonomous vehicles. For instance, it may be desirable to provide information on the intentions of the vehicle or on the status of the vehicle. Lighting devices may for example be used to signal an intended stopping position, the trajectory, acceleration or braking action. Further, a vehicle may signal that a road user has been noticed and the vehicle gives the right of way. Information relating to status of the vehicle, e.g. whether it is in an active or inactive state, the activation of an automated driving mode, a battery or sensor status, etc. may also be given. Corresponding lighting devices may increase road safety and the confidence of other road users relating to the vehicle, in particular in respect to automated and autonomous vehicles.

A simple way to provide communication by means of a lighting device is to display an image in a display module comprising an array of light-emitting elements. Electronic display modules may be suitable to achieve a high response time and high contrast in order to deliver images with high visibility suitable for automotive applications. However, in display modules based on conventional liquid crystal displays (LCDs), the overall energy efficiency may be limited due to internal absorption of light. Moreover, LCDs may be costly to manufacture. As an alternative, organic light-emitting diode (OLED) displays may be used to provide display modules. However, OLEDs may suffer from luminance decay, i.e. a rapid ageing and limited lifetime when operated at a high brightness required for automotive applications, for example a sufficient brightness for driving in conditions with poor visibility.

Displays using light-emitting diodes (LEDs) may provide high energy efficiency and brightness. LEDs however require being arranged in an array of multiple LED dies or LED packages, wherein each of the LEDs needs to be provided with electric energy independently from other LEDs. An individual addressing of LEDs therefore requires a high number of electrical connections, such that LEDs may for example be arranged in an array of lead frames on a common substrate, such as a printed circuit board, comprising a pattern of electrical conductors.

However, arranging an LED arrays on a common substrate limits the shape of the lighting device to a substantially flat shape. For some applications, and in particular due to technical or design considerations, it may be required that the lighting device is able to assume different shapes, i.e. the lighting device should be conformable to the shape of different objects that serve as support for the lighting device. For example, it may be desirable that the lighting device may conform the shape of the body of a car or of an interior panel of a car.

SUMMARY

It is an object of the present invention to provide a lighting device that is simple and cost-effective to produce and that is in particular conformable to different shapes and may provide for various arrangements of light-emitting elements. The invention further relates to a method for producing such a lighting device and a use of such a lighting device based on the aforementioned object.

According to a first aspect of the present invention, a lighting device is provided, comprising: a first wire having a first longitudinal axis; a second wire having a second longitudinal axis, wherein the first wire and the second wire intersect within an intersection region; a light-emitting element arranged at the intersection region and being in electrical contact to the first wire and to the second wire, wherein the first wire comprises a bent section arranged in the intersection region, such that a predefined minimum distance is provided between the first wire and the second wire in the intersection region.

According to a second aspect of the present invention, a method for producing a lighting device is provided, in particular a lighting device according to the first aspect, the method comprising: providing a first wire having a first longitudinal axis with a bent section, providing a second wire having a second longitudinal axis, arranging the first wire and the second wire to intersect within an intersection region with the bent section of the first wire being arranged in the intersection region, such that a predefined minimum distance is provided between the first wire and the second wire in the intersection region, arranging a light-emitting element at the intersection region and establishing electrical contact between the light-emitting element and the first wire and the light-emitting element and the second wire.

According to a third aspect of the present invention, a use of a lighting device according to the first aspect in automotive lighting is described, in particular as communication light, indicator light, signaling light, and/or interior light.

Exemplary embodiments of the first, second, and third aspect of the invention may have one or more of the properties described below.

The lighting device comprises at least one first wire and at least one second wire. The first wire has a first longitudinal axis, which may correspond to the main extension direction of the first wire, i.e. the longest dimension of the wire. In particular, the first wire may comprise at least one straight section, wherein the extension direction of the straight section(s) corresponds to the first longitudinal axis. Analogously, the second wire has a second longitudinal axis, which may correspond to the main extension direction of the second wire. The second wire may be straight in sections or, in some embodiments, straight substantially along its entire length, wherein the extension direction of the straight section(s) corresponds to the second longitudinal axis. The first wire and/or second wire may have a regular cross section. For example, the first wire and/or second wire may be round shaped, in particular circular shaped in cross section. Other cross sections may also be suitable, such as rectangular, square or other polygonal shapes, for instance.

The first wire and second wire are configured to conduct an electrical current, in particular electrical current suitable to operate at least one light-emitting element. In some embodiments, the first wire and/or second wire comprises or consists of Cu or a Cu alloy, $CuFe_2P$ and/or CuNiSi. The light-emitting element is in electrical contact to the first wire and to the second wire, for example, with the first and second wire representing different polarities to provide a voltage to the light-emitting element.

In some embodiments, the at least one light-emitting element may be a light-emitting diode (LED). The LED may comprise at least one semiconductor element such as a p-n-junction, a diode, and/or a transistor. The LED may be provided as LED package, for example in conjunction with a lead frame and/or wire bond(s). The light-emitting element, in particular the LED, may have a light-emitting face and side faces, e.g. with an LED having a flat shape with one of the large surfaces being the light-emitting face. The first wire and/or second wire may be arranged on a face of the light-emitting element situated opposite to the light-emitting face.

In some embodiments, the light-emitting element may comprise an interposer which is in electrical contact to the first wire and the second wire. The interposer may in particular be mounted (directly) on the first wire and/or second wire. Interposers may for instance comprise a combination of electrical conductive and insulating elements, for example as a printed circuit board.

The first wire and the second wire intersect within an intersection region. For instance, the first longitudinal axis and the second longitudinal axis may be arranged at an angle in respect to each other. As the first wire comprises a bent section arranged in the intersection region, a direct contact of the first wire and the second wire is avoided. For instance, the bent section may be represented by a deviation from an otherwise straight configuration of the first wire. In particular, the bent section may be formed by a deviation of the shape of the first wire from the first longitudinal axis. The bent section may be in particular be formed by rounded bends, a U-shaped or V-shaped bend, sharp bends providing a rectangular shape of the bent section. The bent section may have a flat shape or two-dimensional shape, i.e. the bent section is substantially located within a plane, which is for instance a radial plane of the first longitudinal axis. The bent section in particular extends away from the light-emitting element.

In some embodiments, the light-emitting element may be in electrical contact to the first wire and/or second wire by means of wire bonds, wherein the wire bonds are arranged in or near the intersection region. A direct contact, for example by means of solder patches, is also possible. The light-emitting element is arranged at the intersection region, such that the electrical contact to the first wire and the second wire may be provided in a particularly simple manner.

A minimum distance between the first wire and the second wire is provided in the intersection region. The minimum distance is predefined, in particular such that a contact of the first wire and the second wire is avoided during the intended use of the lighting device. In particular, the lighting device may have a substantially flat shape and may be deformable into a shape that conforms the shape of a substrate or a support, e.g. to integrate the lighting device into an object with a complex shape such as a car body or a car interior panel. By using the first wire and second wire as elements for electrical connection, the lighting device may be easily deformed, e.g. by bending the first wire and/or second wire, to obtain various shapes. The bent section of the first wire may ensure that an electrical contact between the first wire and the second wire is avoided even when the lighting device is deformed. Further, the bent section may be configured as spring section. In particular, the bent section may provide additional flexibility and deformability to the first wire. This may be particularly advantageous when stiffer materials are used for the first wire or a large cross section of the first wire is provided, for instance in applications requiring high currents.

According to an exemplary embodiment of the invention, a plurality of first wires and/or a plurality of second wires is provided, intersecting at a plurality of intersecting regions, wherein in a plurality of light-emitting elements is provided, the light-emitting elements being arranged at the intersection regions. The lighting device may therefore comprise an array or a matrix of light-emitting elements such as LEDs. Each light-emitting element arranged at an intersection region is in particular in electrical contact to one of the first wires and one of the second wires in or near the intersection region of the respective first wire and second wire. That is, each light-emitting element may be in electrical contact to an individual pair of one of the first wires and one of the second wires, therefore allowing for an individual addressing of each light-emitting element. That is, each of the light-emitting elements may be activated independently of the other light-emitting elements. For instance, the first wires may correspond to columns of light-emitting elements in the array and the second wires may correspond to rows of light-emitting elements in the array. The array may be regular, e.g. with regular nearest neighbour distances and/or angles between the light-emitting elements or the array may be irregular. In some embodiments, the light-emitting elements may form a rectangular array or square array.

Further, the lighting device may also be stretchable and/or compressible, in particular when no insulating material is arranged between the first wire and the second wire or before insulating material is inserted. For instance, the first wire and the second wire may be stretched and/or compressed to obtain a given distance or distribution of distances between the light-emitting elements. In particular, the lighting device may be produced with a predetermined arrangement of first wires and second wires and a corresponding predetermined distance between the light-emitting elements. The arrangement of first wires and second wires and therefore the positions of the light-emitting elements in the array may be varied by stretching and/or compressing to obtain a specific arrangement as required by the intended application. Different amounts of stress may be applied on different directions, for instance the first wires may be stretched or compressed by a different amount than the second wires. Stretching and/or compression may also be used to obtain an irregular arrangement of light-emitting elements, i.e. with varying distances between the light-emitting elements.

According to another exemplary embodiment of the invention, the lighting device further comprises: a control unit being in electrical contact to the plurality of first wires and/or the plurality of second wires, wherein the control unit is configured to activate part of the plurality of light-emitting elements independently from the remaining light-emitting elements. For example, each of the light-emitting elements or at least groups of light-emitting elements may be activated independently of the remaining light-emitting elements by means of the control unit. For instance, voltages may be applied to specific combinations of first wires and second wires to address specific light-emitting elements. The control unit may provide for a switching of the assignment of voltages and optionally for providing the voltages.

In some embodiments, the control unit may be configured to address light-emitting elements sequentially, e.g. based on a switching frequency. To obtain an image with the lighting device, the corresponding light-emitting elements (i.e. the pixels of the display) may be addressed one after another by applying voltage to the corresponding pairs of first wires and second wires. When the switching frequency is chosen higher than the eye sensitivity, e.g. at least 100 Hz, the sequential addressing of light-emitting elements may form an (apparently continuous) image on the lighting device.

According to another exemplary embodiment of the invention, the first longitudinal axis and the second longitudinal axis are arranged substantially within the same plane. In particular, when a plurality of first wires and/or a plurality of second wires is provided, the first longitudinal axes and the second longitudinal axes corresponding to the plurality of wires are arranged substantially within the same plane. Hence, a substantially flat shaped lighting device is obtained. In particular, the light-emitting element(s) may be mounted on the first wire(s) and second wire(s) in a more simple and secure manner, as a face of the light-emitting element(s), e.g. a face with contact pads, may be arranged on sections of the first wire and second wire that are arranged within the same plane. In particular, the light-emitting element may be arranged on straight sections of the first wire and the second wire, leading to an increase in contact surface between the wires and the light-emitting element for improved electrical conductivity and higher mechanical stability.

According to another exemplary embodiment of the invention, the second wire intersects the first wire substantially in the center of the bent section of the first wire. In particular, the bent section may be symmetrical in respect to a plane comprising the second wire. Hence, the deformation properties of the lighting device may become more uniform, wherein in particular a contact of the first wire and second wire may be avoided irrespective of the direction of deformation.

According to another exemplary embodiment of the invention, at least one of the predefined minimum distance, the material of the first wire and/or second wire, the cross section of the first wire and/or second wire is chosen such that the first wire and second wire avoid contact under a predetermined deformation degree on the first wire and/or second wire. For instance, the lighting device may be intended for an application with a predefined maximum deformation, e.g. a maximum bend angle. The predefined minimum distance, the material of the first wire and/or second wire, the cross section of the first wire and/or second wire may be chosen such that even under the given predefined maximum deformation, a contact of the wires and a possible short circuiting during use is avoided in that the wires are spaced apart also under these deformation conditions. For example, the cross section and material of the wires may be optimized with regard to the requirements in electrical conduction, while the predefined minimum distance may be chosen as small as possible to obtain a smaller intersection region and a more compact lighting device, while the wires are still protected from undesired contact.

According to another exemplary embodiment of the invention, the second wire comprises a bent section. As described above, the bent section of the first wire may be configured as spring section to provide the deformation properties of the lighting device, and providing the second wire with a bent section may optimize the deformation properties of the lighting device further. In particular, multiple intersections are provided, and the second wire or each of the second wires comprise at least one bent section substantially in the center between two intersection regions to obtain more homogeneous deformation properties of the lighting device.

According to another exemplary embodiment of the invention, the light-emitting element is in electrical contact to a contact section of the first wire, which contact section extends along the first longitudinal axis; and/or the light-emitting element is in electrical contact to a contact section of the second wire, which contact section extends along the second longitudinal axis. In particular, the contact sections of the first wire and/or second wire are configured as straight sections extending along the corresponding longitudinal axis. Providing contact sections may lead to an increase in contact surface between the wires and the light-emitting element(s) for improved electrical conductivity and higher mechanical stability.

In some embodiments, the light-emitting elements may be in electrical contact to the first wire and/or second wire by means of a contact material such as solder, in particular solder paste, and/or a conductive adhesive. A contact material allows a simple and reliable production of the lighting device. In particular when contact sections are provided on the first wire and/or second wire, a variety of contact materials may be utilized. The contact material may be chosen to provide a certain degree of rigidity or flexibility. In particular, a solder based on the type SAC 305 has shown advantageous mechanical properties and reliability during a deformation of lighting devices according to the invention. The contact material may connect the first wire and/or second wire with the light-emitting element via contact pads, e.g. contact pads arranged on an interposer or directly on an LED die.

According to another exemplary embodiment of the invention involving at least one light-emitting element comprising contact pads, the contact pads are arranged relative to each other at the predetermined minimum distance between the first wire and the second wire. For example, the predetermined minimum distance between the first wire and the second wire may be given within a plane, wherein the first longitudinal axis and the second longitudinal axis are arranged substantially within the plane. The light-emitting element may be arranged at the intersection region, such that the contact pads may be directly aligned with the first wire and second wire in the intersection region. In particular, the distance of the contact pads corresponds to the distance of contact sections of the first wire and the second wire.

In addition or as an alternative, the contact pads may have an elongated shape being arranged at an angle corresponding to an angle between the first longitudinal axis and the second longitudinal axis. An elongated shape of the contact pads and an angular alignment may increase the contact area between the contact pads of the light-emitting element and the first wire and second wire.

According to another exemplary embodiment of the invention, the first longitudinal axis and the second longitudinal axis are arranged substantially perpendicular to each other in the intersection region. In particular, a particularly simple arrangement of light-emitting elements may therefore be provided.

As described above, the bent section of the first wire may serve to avoid contact between the first wire and the second wire, such that in principle the first wire and/or second wire do not require additional electrical insulation. According to another exemplary embodiment of the invention, however, the light-emitting element, the first wire, and/or the second wire is at least partially covered by an insulating material. The insulating material may be provided to improve the mechanical characteristics of the lighting device and to protect the lighting device from its environment, e.g. from humidity. The insulating material may also improve the optical properties of the lighting device. For example, the light-emitting element, the first wire, and/or the second wire may be overmolded and/or encapsulated with insulating material. The insulating material may for instance be a highly flexible material. The insulating material may further be transparent, opaque or reflective depending on the desired optical properties. An example for a suitable insulating material is silicone. Further, in addition or as alternative, the first wire and/or second wire may be provided with an insulating coating, e.g. a wire jacket comprising insulating material.

According to another exemplary embodiment of the invention, the lighting device further comprises a spacing element arranged between the first wire and the second wire in the intersection region. The spacing element has in particular insulating properties. In some embodiments, the spacing element may extend from the first wire to the second wire and/or may comprise a spring section to provide additional flexibility to the spacing element, such that a deformation of the lighting device and in particular of the first and second wires in the intersection region is not hindered by the spacing element. The spacing element may comprise attachment elements to attach the spacing element to the first wire and/or second wire. In particular, attachment means based on a positive fit may be provided, for example clip-on fittings to the first and/or second wire. In other embodiments, sheet material may be inserted between the first wire and the second wire at the intersection region. The sheet material may comprise insulating materials like polyimides. In some cases, sheet material may (only) be inserted between the first wire and the second wire in the intersection region to avoid electrical contact of the wires. Alternatively, the sheet material may cover at least part of the first wires and in particular multiple intersection regions. The sheet material may comprise openings that correspond to the contact sections of the first wires. The openings may be formed by cutting, in particular laser cutting or laser ablation. The sheet material has in particular a thickness that allows for an easy bending. For example, the sheet material has a thickness of 20 µm to 300 µm.

According to another exemplary embodiment of the invention, the lighting device further comprises a frame element having at least one cavity, wherein the at least one cavities is arranged to surround at least one light-emitting element. The frame element with at least one cavity may for example be configured as a light-guiding element that shapes the illumination pattern of each light-emitting element. In some embodiments, the lighting device may be based on (smaller) light-emitting elements that are arranged spaced apart, allowing a more cost-effective production of the lighting device. The frame element may be configured to spread the illumination of each light-emitting element to provide a practically continuous display. The frame element may for example comprise refractory and/or reflective elements to provide the desired illumination pattern. Further, the frame element may protect the light-emitting element(s) from the environment.

According to another exemplary embodiment of the invention, a contact material stencil with cavities corresponding to contact sections of the first wire and/or contact sections of the second wire is used to apply contact material for establishing the electrical contact. As described above, in particular when the first longitudinal axis and the second longitudinal axis are arranged substantially within the same plane, the first wire(s) and second wire(s) may form a substantially flat shape that allow using a contact material stencil for a simple application of contact material such as solder paste and/or conductive adhesive. The method for producing the lighting device may therefore be performed in a particularly simple manner. As already described above, a sheet material may be inserted between the first wire and the second wire in the intersection region, wherein the sheet material may comprise openings that correspond to the contact sections of the first wire. In some embodiments, the openings in the sheet material, which may for example formed by cutting such as laser cutting or ablation, may also serve as contact material stencil. Contact material such as solder paste may be applied through the openings of the sheet material.

According to another exemplary embodiment of the invention, the lighting device is deformed, in particular from a flat or two-dimensional shape that allows a simple production of the lighting device, to conform the shape of a support for the lighting device. For example, the first wire and/or second wire may be deformed, as the material and cross section of the wires may allow deformation, while the light-emitting elements may be more rigid and may in particular be provided with an interposer that is less deformable. In particular, the bent section of the first wire and optionally of the second wire may provide a substantial amount of the total deformation. Further, the lighting device may be stretched and/or compressed in particular to change the distance between light-emitting elements. Different amounts of stress may be applied on different directions and stretching and/or compression may also be used to obtain an irregular arrangement of light-emitting elements. In particular, stretching and/or compression of the lighting device is performed before insulating material is arranged between the first wire and the second wire, for example before overmoulding insulating material.

The configuration of the support may be defined by the intended application of the lighting device. In some embodiments, the lighting device is used in automotive lighting, in particular as communication light, indicator light, signal light, and/or interior light. The support may for example be a part of the car body or the interior paneling of a car. The arrangement of first wire(s) and second wire(s) in the lighting device may provide a highly deformable lighting device, which can be applied and conformed to the shape of supports.

The features and example embodiments of the invention described above may equally pertain to the different aspects according to the present invention. In particular, with the disclosure of features relating to the lighting device according to the first aspect, also corresponding features relating to the method according to the second aspect and the use according to the third aspect are disclosed.

It is to be understood that the presentation of embodiments of the invention in this region is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

Examples of the invention will now be described in detail with reference to the accompanying drawing, in which.

DETAILED DESCRIPTION OF THE PREFERRED EMBODIMENTS

Figure 1A:
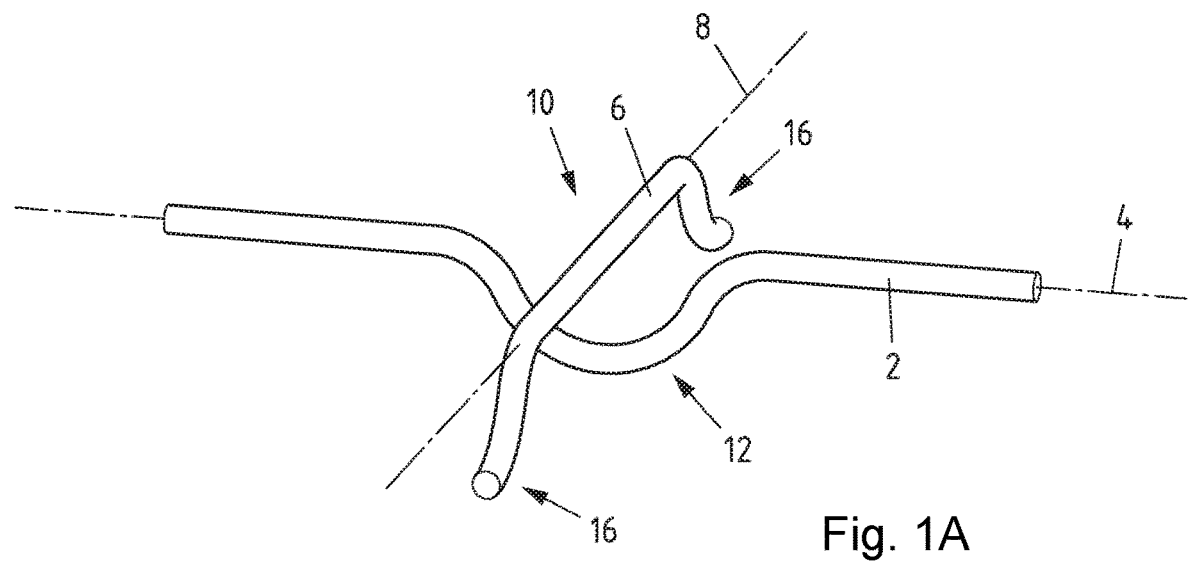
FIG. 1A shows a schematic representation of an arrangement of a first wire and a second wire with an intersection region in a perspective view.

FIG. 1A shows a schematic representation of an arrangement of a first wire 2 having a first longitudinal axis 4 and a second wire 6 having a second longitudinal axis 8. The first wire 2 and the second wire 6 intersect within an intersection region 10.

The first wire 2 comprises a bent section 12 arranged in the intersection region 10. The bent section 12 is configured as a U-shaped bend arranged in a radial plane of the first longitudinal axis 4. The first longitudinal axis 4 and the second longitudinal axis 8 are arranged substantially perpendicular to each other in the intersection region 10. Further, the first longitudinal axis 4 and the second longitudinal axis 8 are arranged substantially within the same plane. As the first wire 2 is provided with the bent section 12, a contact of the first wire 2 and the second wire 6 is avoided.

Figure 1B:
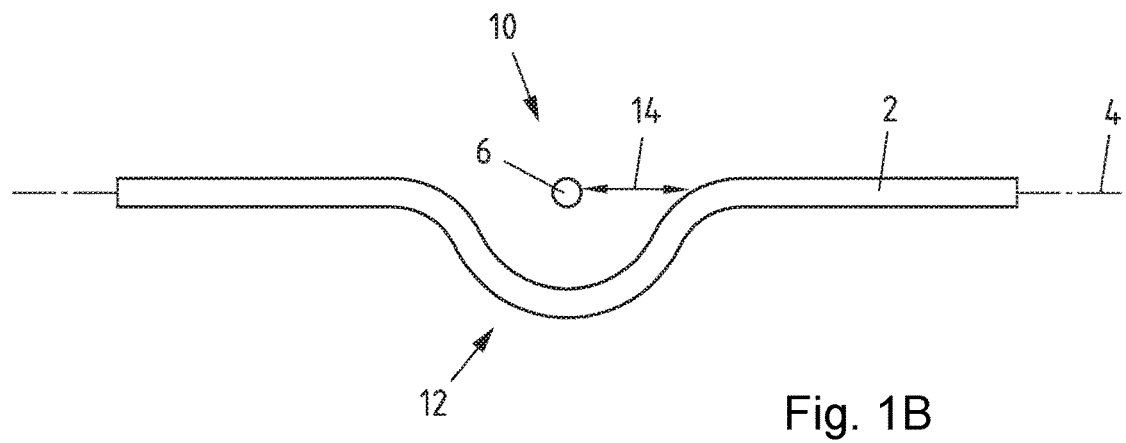
FIG. 1B shows a schematic representation of the arrangement of a first wire and a second wire with an intersection region in a side view.

This can be seen more clearly from FIG. 1B, showing a schematic representation of the arrangement of the first wire 2 and the second wire 6 with the intersection region 10 from FIG. 1A in a side view. A predefined minimum distance 14 is provided between the first wire 2 and the second wire 6 in the intersection region 10. The second wire 6 intersects the first wire 2 substantially in the center of the bent section 12 of the first wire 2. The minimum distance 14 is predefined such that a contact of the first wire 2 and the second wire 6 is avoided during the intended use of the lighting device, for instance when the lighting device is deformed to conform the shape of support such as a car body. The bent section 12 of the first wire 2 may ensure that an electrical contact between the first wire 2 and the second wire 6 is avoided during deformation and is further configured as spring section to improve the deformation characteristics of the lighting device. The second wire 6 also comprises bent sections 16, as can be seen in FIG. 1A, to further improve the deformation characteristics of the lighting device.

In particular, the predefined minimum distance 14, the material of the first wire 2 and the second wire 6, as wells as the cross section of the first wire 2 and second wire 6 are chosen such that the first wire 2 and second wire 6 avoid contact under a predetermined deformation stress on the lighting device, and therefore on the first wire 2 and/or second wire 6.

Figure 2A:
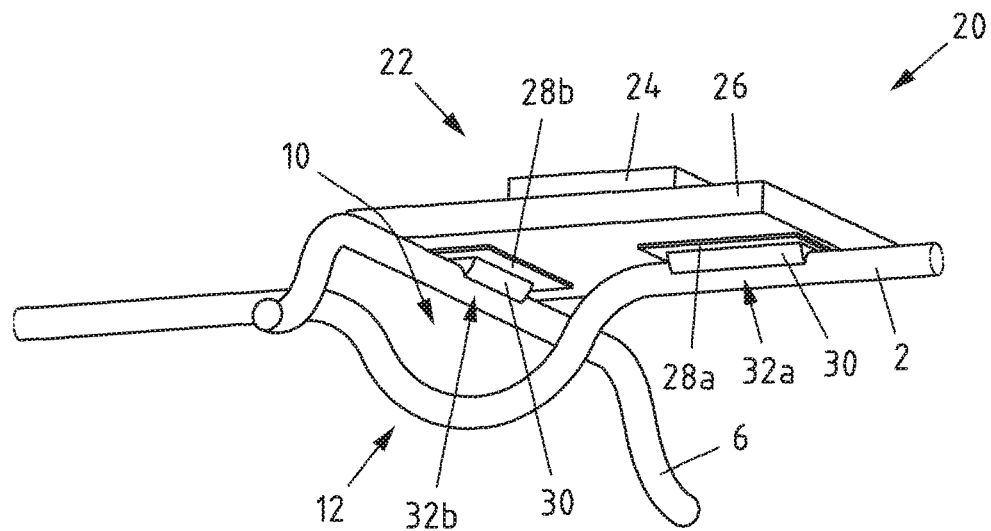
FIG. 2A shows a schematic representation of a first embodiment of a lighting device in a perspective view.
Figure 2B:
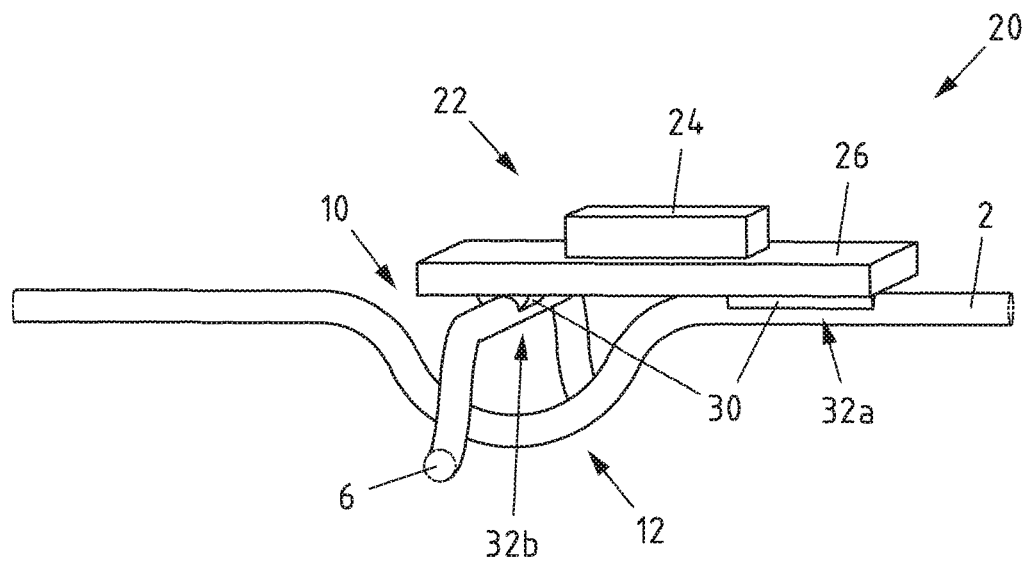
FIG. 2B shows a schematic representation of a first embodiment of a lighting device in another perspective view.
Figure 2C:
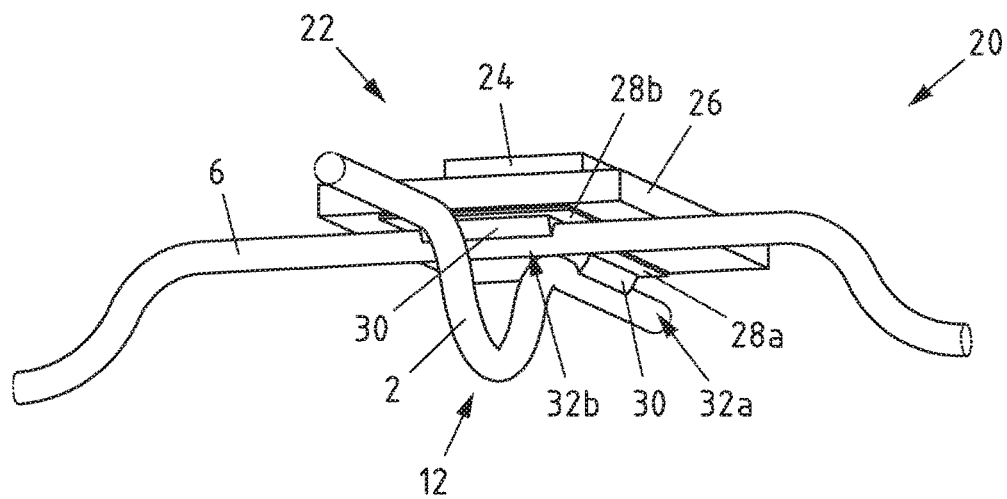
FIG. 2C shows a schematic representation of a first embodiment of a lighting device in another perspective view.
Figure 2D:
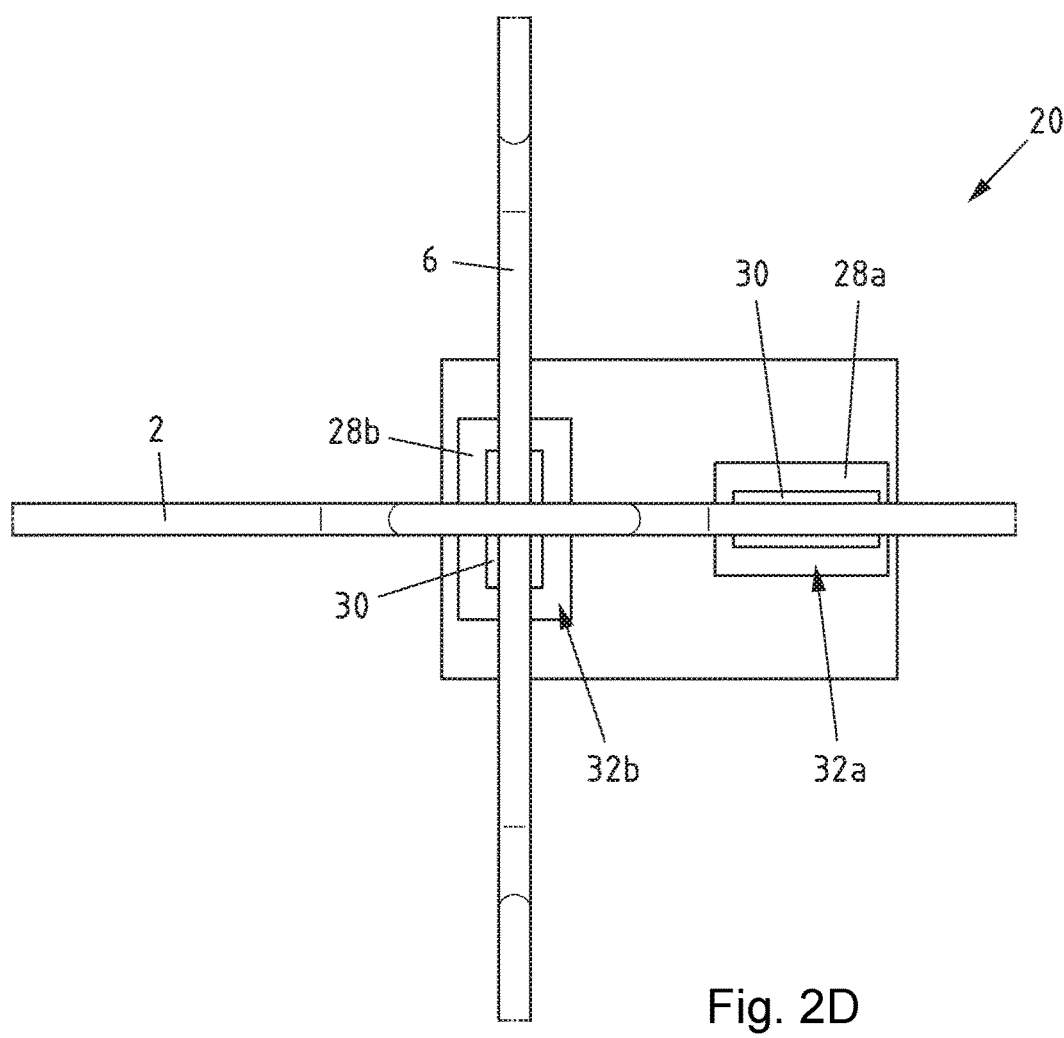
FIG. 2D shows a schematic representation of the first embodiment of a lighting device in a side views.

FIG. 2A-2C show schematic representations of a first embodiment of a lighting device 20 in perspective views based on the arrangement of first wire 2 and second wire 6 shown in FIGS. 1A and 1B. FIG. 2D shows a corresponding side view of the first embodiment of a lighting device 20.

A light-emitting element 22 is in electrical contact to the first wire 2 and to the second wire 6. The light-emitting element 22 comprises an LED die 24 arranged on an interposer 26 having contact pads 28a,b. Contact pad 28a is soldered to the first wire 2 and contact pad 28b is soldered to the second wire 6 in corresponding contact sections 32a, 32b. Solder patches 30 are formed at the contact sections 32a, 32b.

Contact section 32a of the first wire 2 extends along the first longitudinal axis 4 and contact section 32b of the second wire 6 extends along the second longitudinal axis 8. The contact pads 32a, 32b are arranged relative to each other at the predetermined minimum distance between the first wire 2 and the second wire 6. In addition, the contact pads 32a, 32b have an elongated (rectangular) shape and are arranged perpendicular to each other, corresponding to the perpendicular arrangement of between the first longitudinal axis 4 and the second longitudinal axis 8, as can in particular be seen from FIG. 2D. Hence, the contact areas of the first wire 2 and the second wire 6 with the contact pads 32a, 32b and therefore with the light-emitting element 22 are enlarged, improving electrical conductivity and mechanical stability.

Figure 3:
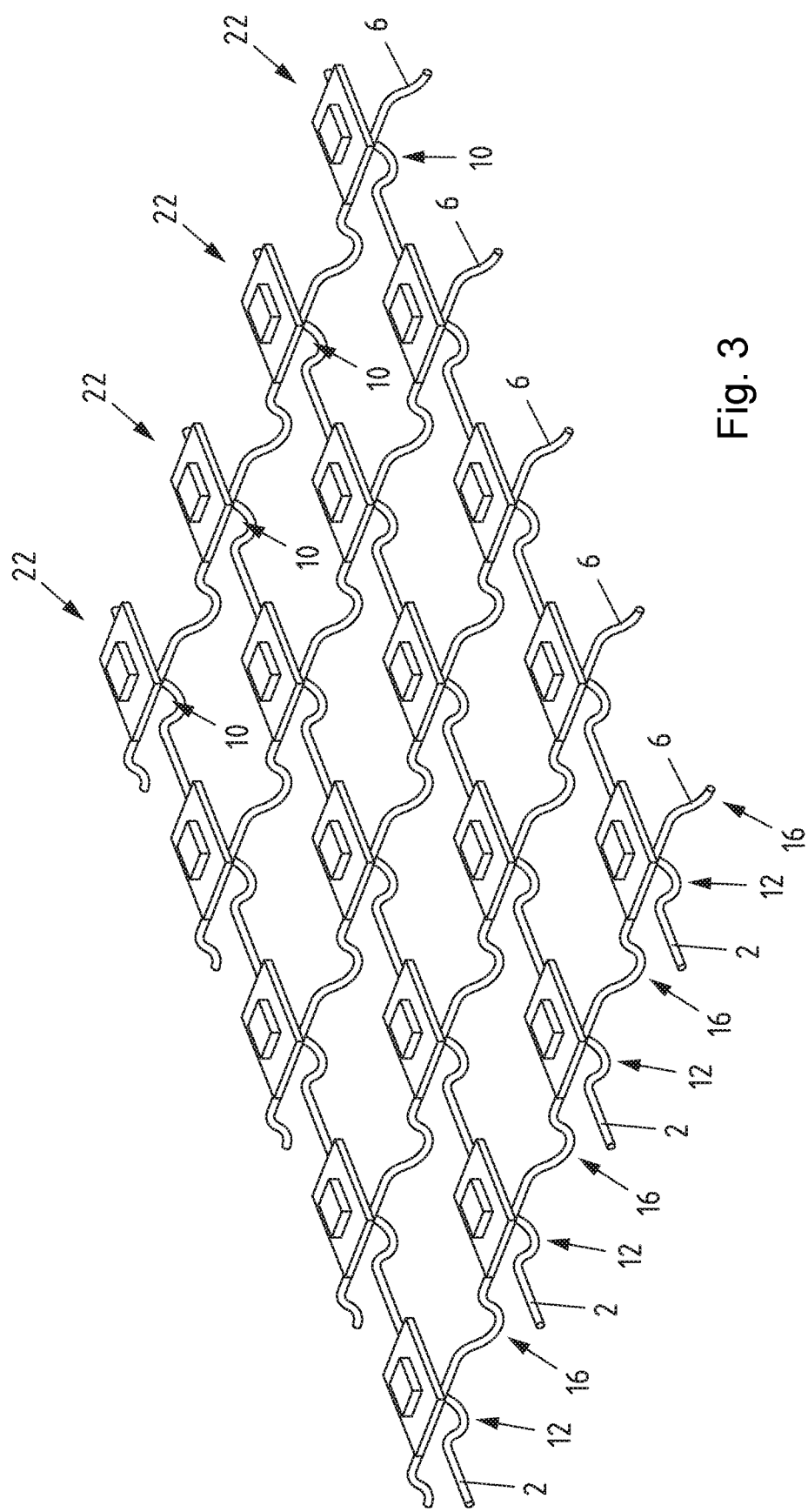
FIG. 3 shows a schematic representation of a second embodiment of a lighting device in a perspective view.

FIG. 3 shows a schematic representation of a second embodiment of a lighting device 20 in a perspective view. A plurality of first wires 2 and a plurality of second wires 6 are provided, intersecting at a plurality of intersecting regions 10. A plurality of light-emitting elements 22 is provided, the light-emitting elements 22 being arranged at the intersection regions 10. The light-emitting elements 22 therefore form an array. The second wires 6 comprise bent sections 16 substantially in the centre between two intersection regions 10. The first wires 2 correspond to columns of light-emitting elements 22 in the array and the second wires 6 correspond to rows of light-emitting elements 22 in the array. Each light-emitting element 22 is therefore in electrical contact to an individual pair of one of the first wires 2 and one of the second wires 6, allowing for an individual addressing of each light-emitting element 22. The array of light-emitting elements 22 is a regular rectangular array, which is in particular useful in automotive lighting. For instance, the lighting device 20 may be used as communication light, as the array may serve as an electronic display module to provide images to other road users. In this embodiment, the array has 4 rows and 5 columns, resulting in 20 individually addressable light-emitting elements 22 forming 20 pixels of a display. Naturally, other configurations of the array and in particular a higher number of rows and columns are possible.

The lighting device 20 is easily deformable and an undesired contact of the first wires 2 and the second wires 6 is avoided by means of the aforementioned arrangement of the first wire 2 and the second wire 6 at the intersection regions 10, and in particular due to the bent section 12 of the first wire 2. The lighting device 20 may therefore be deformed to conform to the shape of a support such as a car body.

The light-emitting elements 22, the first wire 2, and/or the second wire 6 may in addition be at least partially covered by an insulating material such as silicone (not shown). Further, a frame element having at least one cavity may be provided, wherein the at least one cavities is arranged to surround at least one of the light-emitting elements 22 to improve the optical characteristics of the lighting device 20 (not shown).

What is claimed is:
1. A lighting device, comprising:
a plurality of first wires each having a first longitudinal axis and a bent section;

a plurality of second wires each having a second longitudinal axis and a bent section, the plurality of first wires and the plurality of second wires intersecting one another within a plurality of intersection regions such that the first longitudinal axis and the second longitudinal axis are in the same plane, the bent section of each of the plurality of first wires is arranged in one of the plurality of intersection regions, the bent section of each of the plurality of second wires is arranged between two intersection regions of the plurality of intersection regions, and a predefined minimum distance is provided between the plurality of first wires and the plurality of second wires in the plurality of intersection regions; and a plurality of light-emitting elements electrically coupled to the plurality of first wires and the plurality of second wires at the plurality of intersection regions.

2. The lighting device according to claim 1, further comprising:

a control unit communicatively coupled to one or both of the plurality of first wires and the plurality of second wires and configured to activate at least one of the plurality of light-emitting elements independently from other light emitting elements of the plurality of light-emitting elements.

3. The lighting device according to claim 1, wherein the plurality of second wires intersect the plurality of first wires substantially at the center of the bent section of each of the plurality of first wires.

4. The lighting device according to claim 1, further comprising:

a plurality of first electrical contacts that extend along the first longitudinal axis of the plurality of first wires, the plurality of light-emitting elements being electrically coupled to the plurality of first electrical contacts.

5. The lighting device according to claim 1, further comprising:

a plurality of second electrical contacts that extend along the second longitudinal axis of the plurality of second wires, the plurality of light-emitting elements being electrically coupled to the plurality of second electrical contacts.

6. The lighting device according to claim 1, wherein the plurality of light-emitting elements each comprise contact pads arranged relative to each other at the predetermined minimum distance.

7. The lighting device according to claim 6, wherein the contact pads have an elongated shape arranged at an angle corresponding to an angle between the first longitudinal axis and the second longitudinal axis.

8. The lighting device according to claim 1, wherein at least one of the plurality of light-emitting elements, the plurality of first wires, and the plurality of second wires is at least partially covered by an insulating material.

9. The lighting device according to claim 1, further comprising a frame element having at least one cavity surrounding at least one of the plurality of light-emitting elements.

10. The lighting device according to claim 9, wherein the frame is a light guide element.

11. The lighting device according to claim 1, wherein the plurality of first wires are arranged in rows and the plurality of second wires are arranged in columns.

12. The lighting device according to claim 1, wherein the lighting device is an automotive lighting device.

13. The lighting device according to claim 12, wherein the automotive lighting device is one of a communication light, an indicator light, a signal light, and an interior light.

14. A method of manufacturing a lighting device, the method comprising:

providing a plurality of first wires each having a first longitudinal axis and a bent section;

providing a plurality of second wires each having a second longitudinal axis and a bent section;

arranging the plurality of first wires and the plurality of second wires to intersect within a plurality of intersection regions such that the first longitudinal axis and the second longitudinal axis are in the same plane, the bent section of each of the plurality of first wires is arranged in one of the plurality of intersection regions, the bent section of each of the plurality of second wires is arranged between two intersection regions of the plurality of intersection regions, and a predefined minimum distance is provided between the plurality of first wires and the plurality of second wires in the plurality of intersection regions;

arranging a plurality of light-emitting elements at the plurality of intersection regions; and establishing electrical contact between the plurality of light-emitting elements and the plurality of first wires and between the plurality of light-emitting elements and the plurality of second wires.

15. The method according to claim 14, further comprising using a contact material stencil with cavities corresponding to at least one contact section of at least one of the plurality of first wires, at least one contact section of at least one of the plurality of second wires, or at least one contact section of each of the plurality of first wires and the plurality of second wires to apply contact material for establishing the electrical contact.

16. The method according to claim 14, further comprising deforming the lighting device to conform to a shape of a support for the lighting device.

17. The method according to claim 16, further comprising installing the lighting device in an automobile lighting system.

18. The method according to claim 16, further comprising selecting at least one of the predefined minimum distance, a material of the plurality of first wires, a material of the plurality of second wires, a cross section of the plurality of first wires and a cross section of the plurality of second wires such that the plurality of first wires and the plurality of second wires avoid contact under a predefined deformation stress on the lighting device.

19. The method according to claim 16, wherein the arranging further comprises arranging the plurality of first wires in rows and arranging the plurality of second wires in columns.

20. The method according to claim 14, further comprising arranging the lighting device within a frame such that at least one cavity of the frame surrounds at least one of the plurality of light-emitting elements.

* * * * *